United States Patent
Kosaka et al.

(10) Patent No.: US 10,185,488 B2
(45) Date of Patent: Jan. 22, 2019

(54) DEVICE AND METHOD FOR DISPLAYING INFORMATION

(71) Applicant: Sony Corporation, Tokyo (JP)

(72) Inventors: Junichi Kosaka, Tokyo (JP); Jung Myungjin, Kanagawa (JP); Tomoo Mizukami, Tokyo (JP); Daisuke Aoki, Tokyo (JP); Hidekazu Watanabe, Tokyo (JP)

(73) Assignees: SONY CORPORATION, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 466 days.

(21) Appl. No.: 14/326,019

(22) Filed: Jul. 8, 2014

(65) Prior Publication Data
US 2016/0011766 A1    Jan. 14, 2016

(51) Int. Cl.
  G06F 3/0485  (2013.01)
  G06F 3/0488  (2013.01)

(52) U.S. Cl.
  CPC ........ G06F 3/04855 (2013.01); G06F 3/0488 (2013.01)

(58) Field of Classification Search
  CPC ........................... G06F 3/0488; G06F 3/04855
  See application file for complete search history.

(56) References Cited

U.S. PATENT DOCUMENTS

| | | | | |
|---|---|---|---|---|
| 5,835,084 A | * | 11/1998 | Bailey | G06Q 10/107 715/783 |
| 8,260,915 B1 | * | 9/2012 | Ashear | G06F 13/00 709/224 |
| 9,367,227 B1 | * | 6/2016 | Kim | G06F 3/04883 |
| 9,384,672 B1 | * | 7/2016 | Zehr | B42D 3/123 |
| 2002/0184159 A1 | * | 12/2002 | Tadayon | G06Q 20/382 705/54 |

(Continued)

FOREIGN PATENT DOCUMENTS

JP    2005-165573    6/2005

OTHER PUBLICATIONS

Jearl Walker et al. "Fundamentals of physics", 2005, John Wiley & Sons, Inc. 7th ed.*

(Continued)

Primary Examiner — Abdullah Al Kawsar
Assistant Examiner — Sean Hsiao
(74) Attorney, Agent, or Firm — Xsensus LLP

(57) ABSTRACT

Discussed herein is an information processing device that displays information in an effective manner on a display screen of the device. A portion of the total data is displayed on the screen when the total data exceeds the amount of data that can be displayed on the screen at a given time. The information processing apparatus characterizes the portions of data as already-read data portions and unread data portions, based on a speed of a scrolling operation performed when the corresponding data portion is displayed on the device. Further, the apparatus also provides a visual indication for each already-read data portion on the display screen of the device. Thus, a user can correctly identify data portions that have been already read and data portions that are yet to be read.

17 Claims, 11 Drawing Sheets

(56) References Cited

U.S. PATENT DOCUMENTS

| | | | |
|---|---|---|---|
| 2008/0134033 A1* | 6/2008 | Burns | G06F 17/30864 715/705 |
| 2009/0319910 A1* | 12/2009 | Escapa | G06F 17/241 715/751 |
| 2011/0050593 A1* | 3/2011 | Kim | G06F 3/0488 345/173 |
| 2011/0258264 A1* | 10/2011 | Bremner | G06Q 10/107 709/206 |
| 2012/0062604 A1* | 3/2012 | Lobo | G06F 3/0485 345/684 |
| 2012/0158875 A1* | 6/2012 | Almeida | G06Q 30/02 709/206 |
| 2012/0226976 A1* | 9/2012 | Wolter | G06F 3/0485 715/273 |
| 2012/0311438 A1* | 12/2012 | Cranfill | G06F 17/30011 715/256 |
| 2013/0097481 A1* | 4/2013 | Kotler | G06F 17/241 715/230 |
| 2013/0222231 A1* | 8/2013 | Gardenfors | G06F 3/03 345/156 |
| 2013/0227408 A1* | 8/2013 | Shanmugarajah | G06F 15/0291 715/277 |
| 2014/0089110 A1* | 3/2014 | Kazama | G06Q 30/0277 705/14.73 |
| 2014/0324984 A1* | 10/2014 | Chang | H04L 51/32 709/206 |
| 2015/0026590 A1* | 1/2015 | Shirzadi | G06F 3/017 715/751 |
| 2015/0039706 A1* | 2/2015 | Zilmer | H04L 51/36 709/206 |
| 2015/0074595 A1* | 3/2015 | Kashiwagi | G06F 15/0291 715/786 |
| 2015/0142897 A1* | 5/2015 | Alten | H04L 51/36 709/206 |
| 2015/0177933 A1* | 6/2015 | Cueto | G06F 3/0483 715/776 |
| 2015/0242061 A1* | 8/2015 | Patel | G06F 3/017 715/765 |
| 2015/0261292 A1* | 9/2015 | Conzola | G06K 9/00604 345/156 |
| 2015/0355715 A1* | 12/2015 | Smith | G06F 3/017 715/863 |

OTHER PUBLICATIONS

Luke Wroblewski, "Touch Gesture Reference Guide", 2010 http://www.lukew.com/ff/entry.asp?1071.*

"What is the physics equation for speed?" https://www.reference.com/science/physics-equation-speed-e9583f07363e8303.*

"How are speed, distance and time related?" https://www.reference.com/science/speed-distance-time-related-5ca03a53b42304d8.*

* cited by examiner

FIG. 5

| 32823 | 835 | 706 | 378 | 50 | 735 | 7307 |
|---|---|---|---|---|---|---|
| 4562 | 4520 | 7076 | 45 | 430 | 637 | 45 |
| 456345 | 530 | 445 | 9434 | 97 | 134370 | 7606 |
| 563 | 8 | 2 | 40 | 808 | 686 | 142 |
| 456 | 48 | 3453 | 4737 | 96760 | 904590 | 30 |
| 7863 | 77852 | 78 | 9960 | 8077 | 745 | 7057 |
| 783 | 70 | 7070 | 53 | 21034 | 78387 | 78387 |
| 2782 | 2745 | 76 | 70537 | 24 | 760 | 48 |
| 37 | 78 | 345 | 43 | 786 | 89 | 768 |
| 10 | 5154 | 145 | 63785 | 45 | 1050 | 870 |
| 981 | 90 | 945 | 6 | 786 | 98 | 76 |
| 1098 | 14230 | 80 | 6098 | 50 | 108 | 808578 |
| 8904 | 780 | 8405 | 908 | 630 | 8904 | 86 |
| 70 | 230 | 78068 | 45 | 807 | 70 | 770 |
| 301 | 48 | 70 | 630 | 79806 | 5345 | 7860 |
| 870 | 8067 | 9076 | 70 | 505 | 890 | 70677 |

400

401

$$\Delta d = (\Delta x * \Delta x + \Delta y * \Delta y)^{1/2}$$

$$v(t) = \Delta d / \Delta t$$

DEVICE AND METHOD FOR DISPLAYING INFORMATION

BACKGROUND

Field of the Disclosure

The present disclosure relates to an information processing device and a method thereof of efficiently displaying read and unread data portions by a user on a display screen of the device.

Description of the Related Art

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Mobile devices, such as smart phones, PDA's, tablets and the like are generally equipped with a touch display terminal (screen) that is configured to display data for viewing by a user of the mobile device. Typically, the display screen in such mobile devices has a diagonal length that ranges from a few inches to ten inches. Such a limitation on the size of the display screen usually poses restrictions on the amount of data that can be displayed on the screen at a given time. For example, if the mobile device displays a web-page on the screen, it is more than likely that the entire content of the web-page cannot be displayed on the screen at a given time. Rather, only a part of the entire content of the webpage is displayed on the screen, along with a scrollbar that is displayed at a predetermined position on the screen. The user typically performs a swipe operation either with his/her finger or with a stylus on the surface of the display screen in order to scroll through the information. An indicator displayed within the scroll bar indicates the position of the current information that is being displayed on the screen within the entire information content that is to be displayed.

However, in scenarios wherein a large quantity of information is to be displayed, a user who intends to read previously unread portions of the information, typically results in either spending an undesirable amount of time performing a scroll operation in order to correctly locate the unread portions of information, or results in re-reading parts of information that have already been read previously. Accordingly, there is a requirement for efficiently displaying information on the display screen of the mobile device.

SUMMARY

The present disclosure provides for displaying information in an effective manner on a device, such that a user can correctly identify portions of information that have been previously read and portions of information that are un-read by the user.

Accordingly, one exemplary embodiment of the disclosure is directed to an information processing apparatus. The information processing apparatus includes circuitry configured to: display a data portion of a plurality of data portions, determine whether each data portion is one of an already-viewed data portion and an unviewed data portion based on a speed of a scrolling operation performed while displaying the data portion, and generate and display an indicator corresponding to each data portion determined as the already-viewed data portion, a location of the indicator corresponding to the location of the already-viewed data portion within the plurality of data portions.

According to another exemplary embodiment, the disclosure is directed to a method performed by an information processing apparatus, wherein the method includes the steps of: displaying, on a display panel, a data portion of a plurality of data portions; determining, by circuitry, whether each data portion is one of an already-viewed data portion and an unviewed data portion based on a speed of a scrolling operation performed while displaying the data portion; and generating and displaying an indicator corresponding to each data portion determined as the already-viewed data portion, a location of the indicator corresponding to the location of the already-viewed data portion within the plurality of data portions.

According to another exemplary embodiment, the disclosure is directed to a non-transitory computer-readable medium including computer program instructions, which when executed by an information processing apparatus, cause the information processing apparatus to perform a process including the steps: displaying, on a display panel, a data portion of a plurality of data portions; determining, by circuitry, whether each data portion is one of an already-viewed data portion and an unviewed data portion based on a speed of a scrolling operation performed while displaying the data portion; and generating and displaying an indicator corresponding to each data portion determined as the already-viewed data portion, a location of the indicator corresponding to the location of the already-viewed data portion within the plurality of data portions.

The foregoing general description of the illustrative implementations and the following detailed description thereof are merely exemplary aspects of the teachings of this disclosure, and are not restrictive.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 illustrates a non-limiting example depicting data displayed on a display screen by performing a scroll operation in the vertical and horizontal direction;

DETAILED DESCRIPTION

Figure 1:
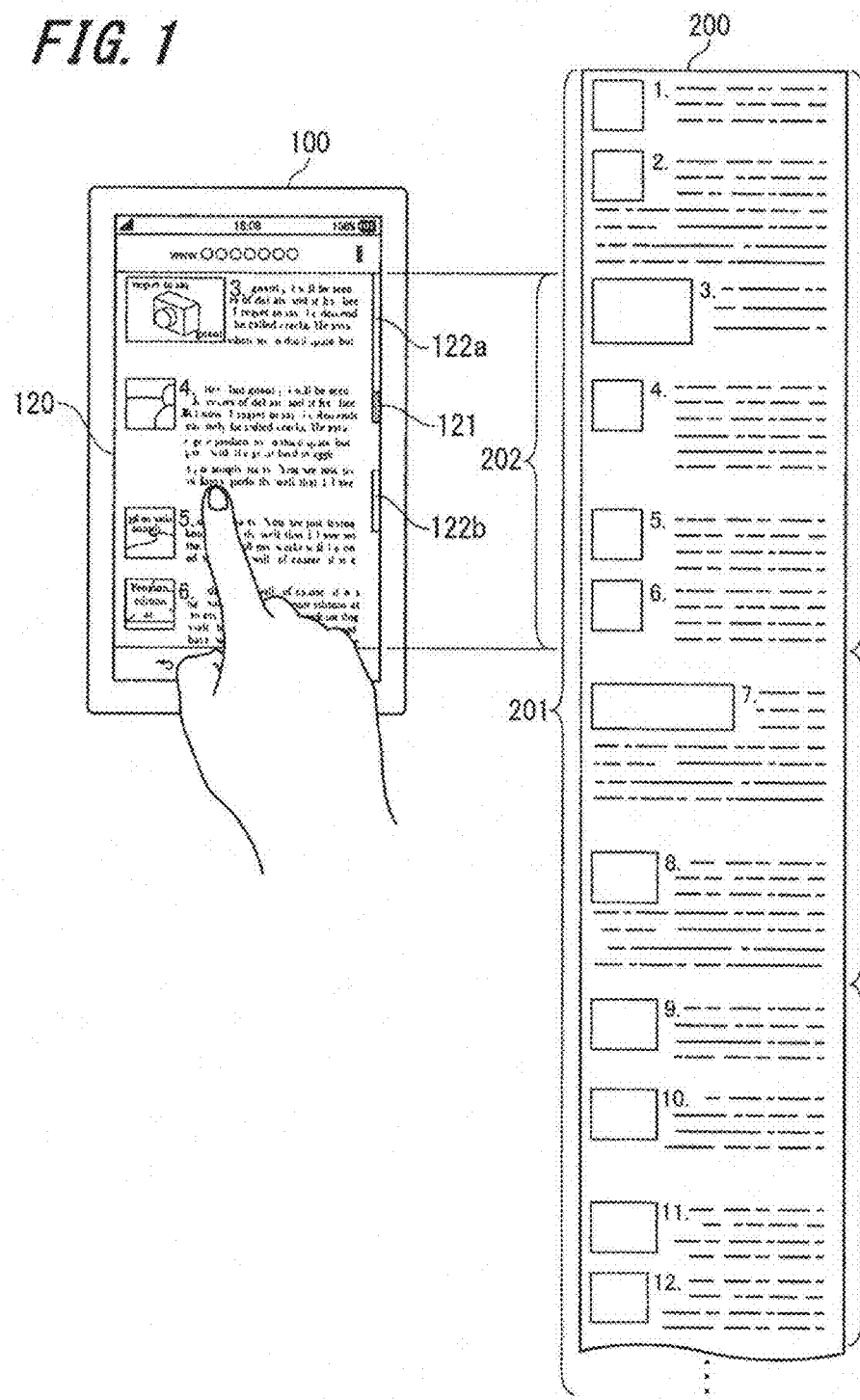
FIG. 1 illustrates a non-limiting example depicting the identification of read and unread portions on a display screen of a mobile device.

Referring now to the drawings, wherein like reference numerals designate identical or corresponding parts throughout the several views.

FIG. 1 illustrates a non-limiting example depicting the identification of read and unread portions of data by a user on a display screen of a mobile device. In FIG. 1, the mobile device 100 may be a smart phone that is equipped with a comparatively large display screen 120. When the display screen 120 of the mobile device 100 displays a longitudinally long data, an indicator 121 that is positioned within a scrollbar (and freely movable within the scrollbar) provides a visual indication to a user as to a position of the currently displayed portion of the data within the overall longitudinal data 200. The scrollbar may be displayed at a predetermined position of the display screen or alternatively may also be chosen by the user to be displayed at a preferred location.

FIG. 1 depicts a portion 202 of the overall data 201 that is currently displayed on the display screen 120. The position of the indicator 121 within the scrollbar corresponds to a location of the portion of data 202, within the overall data 201. The user may scroll through the information to be displayed on the device by implementing, for instance, a swipe operation in the vertical direction (upwards/downwards) to enable corresponding data portions to be displayed on the display screen 120.

The mobile device 100 is further configured to provide a visual indication to the user regarding the portions of the overall data that have been already viewed by the user. For instance, according to an embodiment, bars 122a and 122b can be displayed within the scrollbar to indicate to the user that the corresponding data portions 211 and 212 of the overall data 200 have already been viewed by the user. The portion of the scrollbar between the indicator 121 and the bar 122b is blank thereby denoting that the corresponding data portion 221 has not yet been viewed by the user. Accordingly, in the present embodiment, read and unread portions of the overall data 200 are indicated by the presence or absence of bars within the scrollbar to provide a visual indication to the user.

Further, the mobile device 100 is configured to determine that a portion of data is an already-read data portion by the user, based on a scrolling speed of the indicator 121, at the time instant the corresponding data portion was displayed on the display screen. Specifically, if the scrolling speed while displaying the portion of data is below a predetermined threshold, the corresponding data portion may be determined to be an already-read data portion by the user. The mobile device may be configured to display a bar within the scrollbar to indicate the location of the already-read data portion. This provides the user with a visual indication that the corresponding data portion has been viewed by the user. Similarly, if a particular data portion of the overall data is displayed on the display screen for a certain amount of time, then the corresponding data portion may be determined as an already-read data portion. Data portions that have not been determined as already-read data portions are identified as unread data portions (i.e., data portions that have not been viewed by the user), and an indication as to the locations of such unread data portions may be provided for instance, by leaving the corresponding location within the scrollbar as a blank/empty space.

Although FIG. 1 depicts the case where data extends in a vertical direction, and the user browses through the information by performing a swipe operation directed either vertically upwards or vertically downwards, the features of the example described in FIG. 1 are equally applicable to other scenarios of data display. For instance, when data is displayed in a horizontal direction and the user browses through the information by performing a sideways swipe operation or the scenario wherein the data content is displayed in both, the vertical and horizontal directions (i.e., the data extends in both the longitudinal and latitudinal directions), the above feature of displaying unread-data and read data portions is equally applicable.

Figure 2:
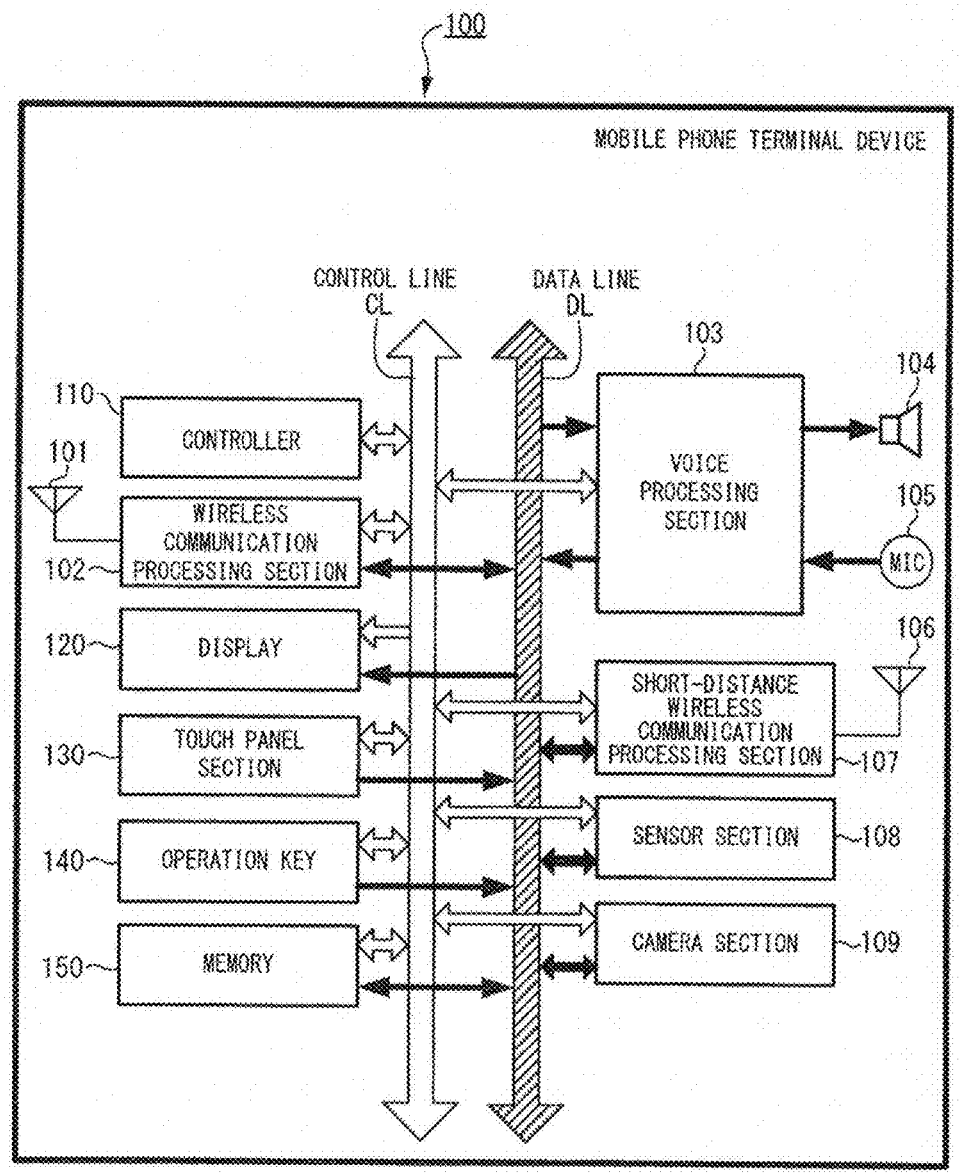
FIG. 2 illustrates schematically an exemplary mobile phone terminal device.

FIG. 2 illustrates a schematic block diagram of an exemplary mobile phone terminal device 100. As shown in FIG. 2, the mobile phone terminal device 100 may include an antenna 101 and a wireless communication processing section 102. The wireless communication processing section 102 may communicate wirelessly via radio signals, or the like, with other mobile devices via a base station. Further, a data signal, such as a voice transmission from another user, may be received by antenna 101 and sent to the wireless communication processing section 102 for further processing. In the case of an incoming voice transmission, the voice data signal may be sent from the wireless communication processing section 102 to a voice processing section 103. Incoming voice data received by the voice processing section 103 via the wireless communication processing section 102 may be output as sound via a speaker 104.

Conversely, an outgoing voice signal may be supplied by a user to the voice processing section 103 via a microphone 105. The voice signal received via microphone 105 and processed by the voice processing section 103 may be sent to wireless communication processing section 102 for transmission by the antenna 101. The voice processing section 103 may include a digital signal processor (DSP) which digitizes the incoming analog signal and processes the audio input to detect for keywords. Keywords may enable the operation of device 100, when it is configured to operate under the instructions of specific voice commands.

A second antenna 106 may be supplied for use with a short distance wireless communication processing section 107. The short distance wireless communication processing section 107 may communicate wirelessly with other devices over a network, such as the Internet, a local area network (LAN), or a wide area network (WAN). The second antenna 106 may, e.g., by a Wi-Fi transceiver.

A sensor section 108 may be provided for the mobile phone terminal device 100. The sensor section 108 may be a motion sensor that detects a motion of an object in the proximity of the mobile phone terminal device 100. The motion may correspond to a user moving an instruction object, such as a finger or stylus, in the proximity of the mobile phone terminal device 100 for the purpose of selecting data displayed on display 120.

The mobile phone terminal device 100 may include display 120. The display 120 may be, for example a liquid crystal display (LCD) panel, an organic electroluminescent (OLED) display panel, a plasma display panel, or the like. The display 120 may display text, an image, a web page, a video, or the like. For example, when the mobile phone terminal device 100 connects with the Internet, the display 120 may display text and/or image data which is transmitted from a web server in Hyper Text Markup Language (HTML) format and displayed via a web browser. The display 120 may additionally display data stored in a memory 150.

A touch panel section 130 can detect a touch operation on the surface of the display 120. For example the touch panel 130 can detect a touch operation performed by an instruction object such as a finger or stylus. Touch operations may correspond to user inputs such as a selection of an icon or a character string displayed on the display 120. The touch panel section 130 may be an electrostatic capacitance type device, a resistive type touch panel device, or other such type devices for detecting a touch on a display panel.

The touch panel section 130 may perform processing related to touch operation classification. For example, the touch panel section 130 may assign a predetermined function to be performed when a "tap" touch operation is detected. Similarly, the touch panel section may analyze a touch operation in which the instruction object makes continuous contact with the display 120 while moving the instruction object around the display 120 (e.g., a "swipe" operation). The touch panel section 130 may output a signal based on a classification of the touch operation performed. The signal may for example include information indicating the touch operation classification, the location on the display 120 where the touch operation was performed, and the operation to be performed based on the touch operation.

Data which is detected and processed by the touch panel 130 can be transmitted to a host controller 110. The host controller/processor 110 may include one or more processor units and can control each element of the mobile phone terminal device 100 based on data detected by the touch panel 130, or by inputs received from operation key 140. The operation key 140 may receive inputs, e.g., from external control buttons included with the mobile phone terminal device 100. The external control buttons may for example control the volume, the power, or a hold operation for the mobile phone terminal device 100.

The host controller 110 may further execute instructions stored in the memory 150. The controller may further comprise of a DSP driver, which is configured to communicate with the DSP. Specifically, the driver may actuate the DSP during a voice registering phase, or the DSP may initiate communication with the driver upon the successful detection of a voice command. The driver may further activate the host processor to execute a certain application based on the received voice commands. To this end, the memory 150 may be a non-transitory computer readable medium having instructions stored therein for controlling the mobile phone terminal device 100. Further, the controller 110 may include one or more processors for executing the instructions stored on the memory 150.

The mobile phone terminal device 100 can include a control line CL and a data line DL as internal bus lines for communication. The control line CL can be used to transmit control data from the controller 110. The data line DL may be used for the transmission of voice data, display data, or the like, throughout the various elements of the mobile phone terminal device 100.

Figure 3:
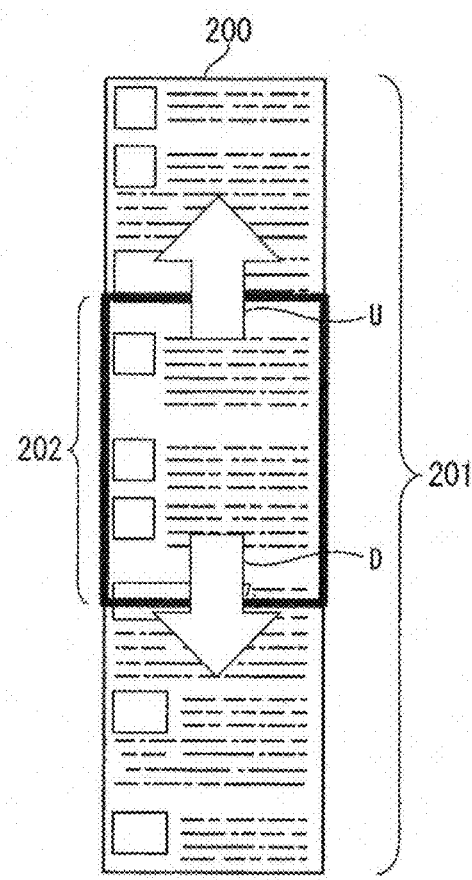
FIG. 3 illustrates a non-limiting example depicting data displayed on a display screen by performing a scroll operation in a vertical direction.

FIG. 3 illustrates a non-limiting example depicting data displayed on a display screen of the mobile device by performing a scroll operation in a vertical direction. In FIG. 3, the total data 200 that is to be displayed on a display screen of a mobile device has a length 201 that exceeds the length of the display screen. Such data may correspond for example, data of a webpage that is accessed via the Internet. At a given time instant, data corresponding to area represented as 202 is displayed on the display screen of the mobile terminal. Specifically, only a portion 202 of the overall data 200 is displayed on the mobile device. Further, the user may perform a scroll operation for example, by swiping a finger/stylus on the surface of the display screen in a vertically upward direction (represented by 'U') or a vertically downward direction (represented by 'D'), in order to have the corresponding data portion being displayed on the mobile device.

Figure 4:
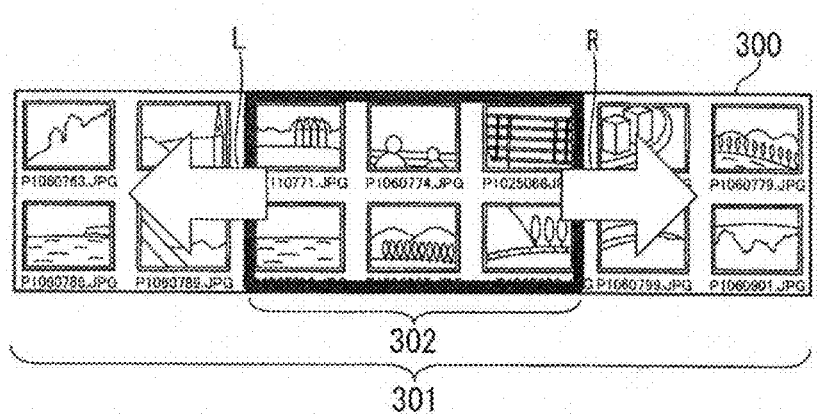
FIG. 4 illustrates a non-limiting example depicting data displayed on a display screen by performing a scroll operation in a horizontal direction.

FIG. 4 depicts a non-limiting example depicting data displayed on a display screen of the mobile device by performing a scroll operation in the horizontal direction. FIG. 4 depicts a plurality of picture thumbnails arranged in a horizontal manner, such that the overall data (collection of pictures) 300 has a horizontal length 301 that is much larger than that the width of the display screen. At a given time instant, data corresponding to portion 302 is displayed on the display screen. The user may perform a scroll operation in a horizontally rightward direction (represented by 'R') or a horizontally leftward direction (represented by 'L') by performing a swipe operation, to have the corresponding data portion displayed on the display screen.

FIG. 5 illustrates a non-limiting example depicting data displayed on a display screen of the mobile device by performing a scroll/swipe operation in the vertical and horizontal direction. Specifically, FIG. 5 depicts a spreadsheet 400 including a plurality of numbers arranged in a two-dimensional manner. The length of data in both the horizontal direction as well as the vertical direction is much larger than what can be displayed on the display screen at any given time instant. Thus, in such a scenario, the mobile device is configured to display only a portion of the data 401 on the display screen. The user may perform a scroll operation in the horizontal left (L), horizontal right (R), vertically up (U) or vertically down (D) directions to display a corresponding portion of the overall data on the display screen.

Figure 6:
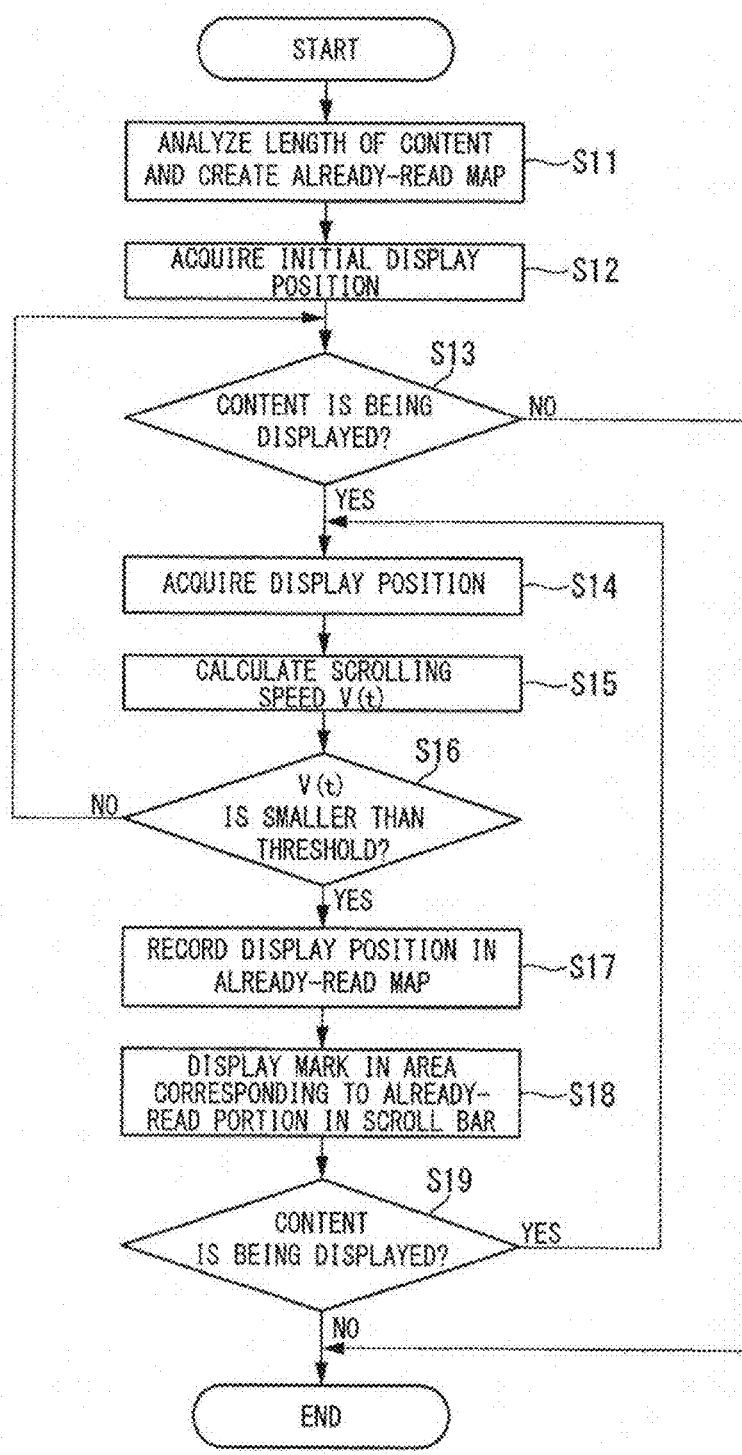
FIG. 6 illustrates a flowchart depicting the steps performed to identify portions of already-read data.

FIG. 6 illustrates a flowchart depicting the steps performed by a processor (for instance the controller 110) of the mobile device in identifying portions of data that are already-read by the user. The steps in FIG. 6 are performed when the amount of overall data that is to be displayed is greater than the amount of data that can be displayed on the display screen of the mobile device at any given time instant. For instance, if the dimension of data that is to be displayed is more in at least one of a longitudinal and/or a horizontal direction, the processor performs the steps of FIG. 6 to identify portions of data that are already-read by the user as well as to provide a visual indication to the user as to which data portions have been already read by the user.

The process in step S11 analyzes the length of data that is to be displayed on the display screen of the mobile device. The processor may accordingly display a scrollbar on the display screen, thereby enabling the user to browse (via a swipe operation) different portions of the overall data. The length of the scrollbar corresponds to the length of the total data that is to be displayed on the device. As stated previously, the position of the indicator within the scrollbar indicates a corresponding position of a portion of data (currently being displayed) within the overall data. Further, in step S11, the processor creates a map (a position map) to store the already-read portions of the overall data. The map may be stored in a memory 150 of the mobile device.

In step S12, the processor acquires an initial display position of the portion of data that is being displayed on the display screen. In step S13, a query is made to determine whether a portion of the data is currently being displayed on the display screen. If the response to the query is affirmative, the process proceeds to step S14, else if the response to the query is negative, the process terminates.

In step S14, the processor acquires a position of the portion of data that is currently being displayed on the display screen of the mobile device. In step S15, the processor computes a scrolling speed (denoted by V(t)), at which the content that is being displayed on the screen changes. If there no movement of the display, i.e., the display is stationary, then scrolling speed is set as V(t)=0. On the other hand, when the user for instance performs a swipe operation, the scrolling speed is computed based on a rate at which the display portion changes.

In step S16, the processor queries if the computed scrolling speed in step S15 is smaller than a predetermined threshold. If the response to the query is negative, the process loops back to step S13. If the response to the query is affirmative, the process proceeds to step S17. If the scrolling speed is not smaller than the predetermined threshold, it indicates that the user has performed a swipe operation at a high speed. Such a high speed is indicative that the data portion that was displayed on the screen was not read by the user. On the other hand, if the scrolling speed is smaller than the threshold, it indicates that the user has read the data portion that was displayed on the screen. Such a data portion read by the user is to be marked as an already-read data portion by the user.

In step S17, the processor records the display position (acquired in step S14) of the portion of data that is displayed on the screen and enters a corresponding record in the already-read map that is created in step S11. The process then proceeds to step S18, wherein a mark (e.g., a bar) is displayed within the scroll bar to correspond to the position of the already-read data portion. Such a mark within the scroll bar provides a visual indication to the user that the corresponding data portion has already been read by the user.

Further, in step S19 a query is made to determine if data is being displayed on the display screen of the mobile device. If the response to the query is affirmative, the process loops back to step S14 and repeats the process of identifying already portions of the data. However, if the response to the query is step S19 is negative, the process terminates.

Figure 7:
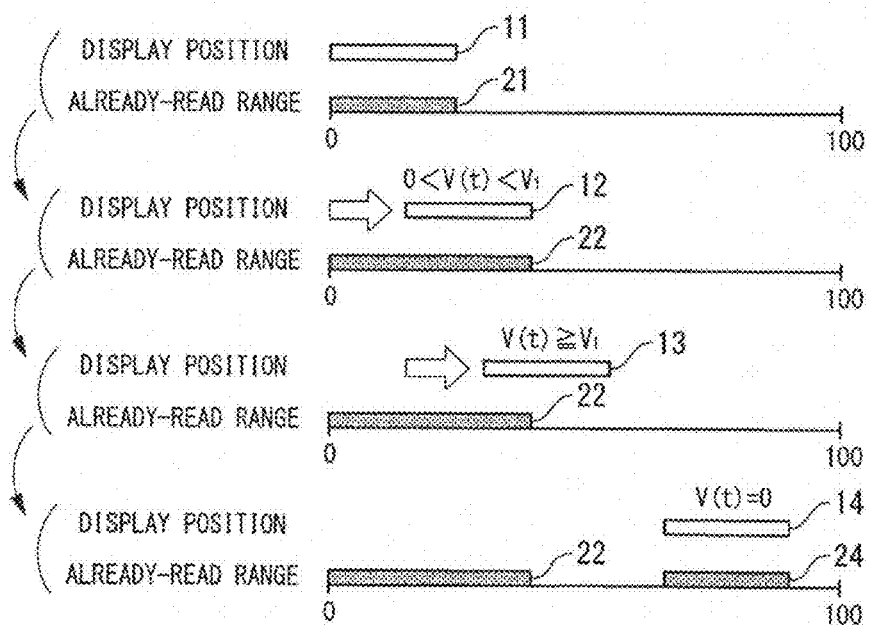
FIG. 7 depicts a non-limiting example illustrating the computation of already-read portions of data while performing a scroll operation.

FIG. 7 depicts a non-limiting example illustrating the computation of already-read portions of data by the user, based on a speed of performing a scroll operation. For sake of simplicity, it is assumed that a left end of the already-read range is 0 and a right end of the already-read range is 100.

Initially, as depicted in FIG. 7, it is assumed that the mobile device is displaying a portion of data corresponding to a display position 11. Further, since the display is stationary (i.e., no scrolling operation has yet been performed), the scrolling speed V(t) is set to 0. Thus, the corresponding data portion is marked as an already-read portion (denoted as 21) and saved in the already-read map.

Upon the user performing a scrolling operation, the display position changes from the initial state 11 to a new position represented as 12. Since the scrolling speed V(t) is lower than a predetermined threshold ($V_1$), the processor determines that the data portion corresponding to the display position 12 is an already-read data portion. Thus, the range of already-read data is updated from the range 21 to a new range 22. The processor saves the new already-read data range in the already-read map.

Further, when the user performs a scroll operation changing the display position from 12 to a new position 13, the processor detects that the speed of the scrolling operation exceeds the predetermined threshold. Specifically, the speed of scrolling V(t) is greater than the predetermined threshold $V_1$. The new data portion corresponding to the new position 13 is not detected as an already-read data portion, and thus is not added to the already-read data portion map.

Finally, upon the user performing a further scroll operation, the display position corresponds to a position represented as 14. As shown in FIG. 7, at this time instant, the display is stationary (i.e., scrolling speed V(t)=0). Thus, the data portion corresponding to display position 14 is marked as an already-read area (24) and saved in the already-read map. The processor of the mobile device is configured to mark portions 22 and 24 on a scroll bar that is depicted on the display screen so as to provide a visual indication to the user that the data portions corresponding to the marks have already been read by the user.

Figure 8:
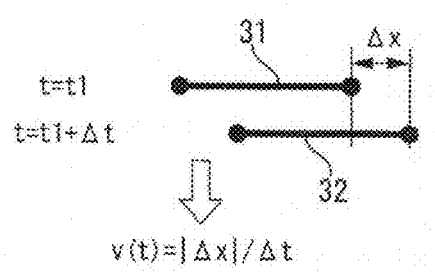
FIG. 8 depicts a non-limiting example illustrating the calculation of a scrolling speed of a data portion displayed on the mobile device.

FIG. 8 depicts a non-limiting example illustrating the calculation of a scrolling speed of a data portion displayed on the mobile device. Assume that at time t=t1, an initial data portion displayed on the display screen of a mobile device is represented as 31. Upon the user performing a scroll operation the display portion shifts by amount $\Delta x$, from the initial position 31 to a new display portion represented as 32. Further, the shift occurs in time $\Delta t$. Thus, at time t=t1+$\Delta t$ the display corresponds to display portion 32. The speed of scrolling can be computed as a rate of change of the displacement as follows: $V(t)=|\Delta x|/\Delta t$.

Figure 9:
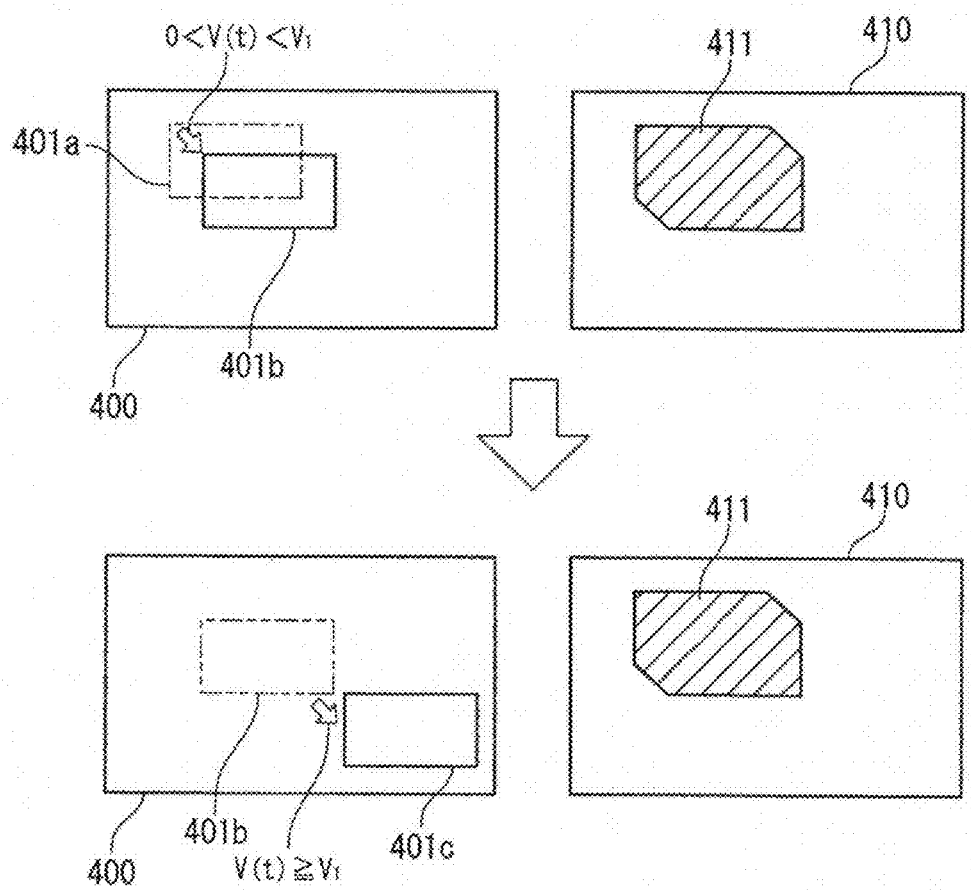
FIG. 9 depicts another non-limiting example illustrating the computation of already-read portions of data while performing a scroll operation.

FIG. 9 depicts another non-limiting example illustrating the computation of the already-read portions of data while performing a scroll operation. In the present example, the scrolling operation can be performed in a vertical as well as the horizontal direction. In FIG. 9 (upper left figure), the dotted box 401a represents the portion of the overall data 400 that is displayed on the display screen. Upon the user performing a scrolling operation, the display box is changed from position 401a to a new position 401b. Since the speed of the scrolling operation (in moving from 401a to 401b) is less than a predetermined threshold, the processor marks the area, represented as 411, in FIG. 9 (upper right) as the area that has already been read by the user. The processor maintains a list of such already-read areas in an area map 410.

Further, when the display box changes position from 401b to 401c as shown in the bottom left figure, the processor detects that the speed of the scrolling operation is greater than the predetermined threshold (i.e., $V(t) \geq V_1$). Thus, the processor does not mark or add any area as an already-read area to the area map 410.

In the present example, the already-read areas are based on a movement of the display box in both, the horizontal and vertical directions. The processor may be configured to display the area map 410 in a predetermined location on the display screen, thereby providing the user a visual indication of the areas of the overall content region 400 that have been traversed by the user.

Figure 10:
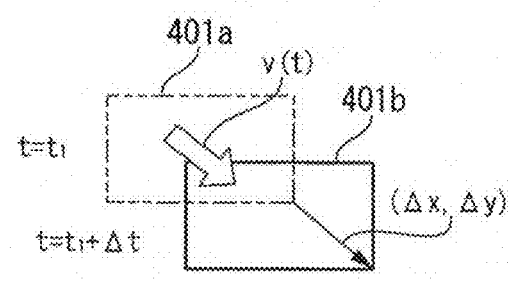
FIG. 10 depicts another non-limiting example illustrating the calculation of a scrolling speed of a data portion displayed on the mobile device.

FIG. 10 depicts a non-limiting example illustrating the calculation of a scrolling speed of a data portion displayed on the mobile device. The calculations of the scrolling speed of the display box depicted in FIG. 10 correspond to the example described in FIG. 9.

In FIG. 10, assume that a display box 401a is initially displayed on the display screen at time t=t1. Via a scroll operation performed at speed V(t), the display is changed to the display box 401b. Thus, at time t=t1+Δt, the display box located at position 401b is displayed on the screen. The displacement of the display box from 401a to 401b includes a horizontal displace of Δx and a vertical displacement of Δy. Thus, a moving distance (net displacement) of the display box represented as Δd can be computed as follows: $\Delta d = \sqrt{(\Delta x)^2 + (\Delta y)^2}$. Thus the speed of scrolling can be computed as $V(t) = \Delta d / \Delta t$.

Figure 11:
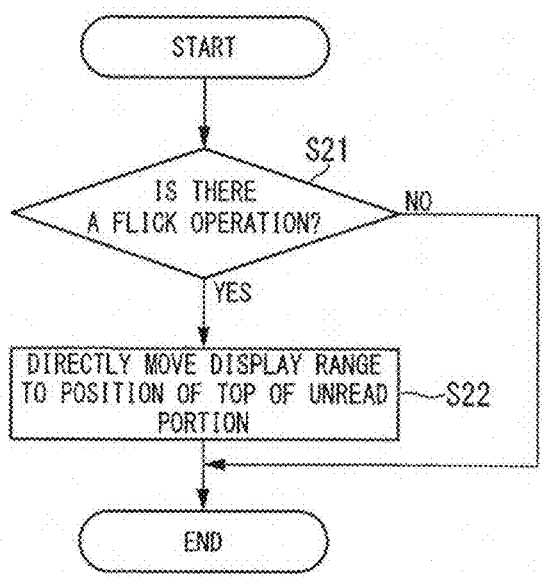
FIG. 11 depicts a flowchart illustrating the steps performed to detect a flick operation.

FIG. 11 depicts a flowchart illustrating the steps performed by a processor of the mobile device to detect a flick operation. Specifically, a flick operation can be characterized as an operation of sliding a finger (or stylus) on a touchscreen of the mobile device. The speed at which a flick operation is performed in much greater than a swipe operation. According to an embodiment, the mobile device may be configured to display only certain portions of the data on detecting a flick operation.

In step S21, a query is made to determine if a flick operation has been detected in an upward direction. The upward direction in the present embodiment is one which is directed towards a top edge of the mobile device. If the response to the query is negative the process terminates. Specifically, if there is no flick operation detected or if a flick operation in a direction other that the upward direction is detected, the process terminates. If the response to the query is affirmative, the process proceeds to step S22.

In step S22, the processor is configured to change the display from the current data portion that is being displayed on the mobile device to a first unread data portion by the user. Upon displaying the first unread portion, the process in FIG. 11 terminates.

Although in the present embodiment, the process terminates when a flick operation in a direction other than the upward direction is detected, several modifications and variations of the present embodiment are possible in light of the above teachings. For instance, if a flick operation is detected in a downward direction, the last unread portion of data may be displayed on the display screen of the mobile device.

Figure 12:
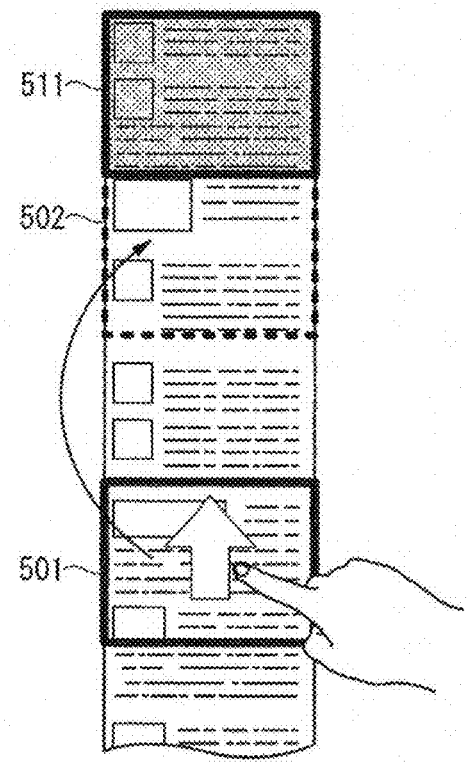
FIG. 12 illustrates according to an embodiment a non-limiting example depicting a flick operation.

FIG. 12 illustrates a non-limiting example depicting a flick operation. In FIG. 12, a longitudinally long content of data is to be displayed on the display screen of the mobile device. The user performs a swipe operation in order to browse through the overall content. In FIG. 12, data portion 511 corresponds to a data portion that has already been read by the user. Data portion 502 corresponds to a data portion that has not yet been read by the user.

Further, assume that the data portion 501 is currently being displayed on the mobile device. At this instant, if the user performs a flick operation, the mobile device is configured to change the display from the data portion 501 to display the first unread portion 502. While displaying the first unread portion of data 502, it must be noted that the display begins at a head position of the unread portion of data 502.

Figure 13:
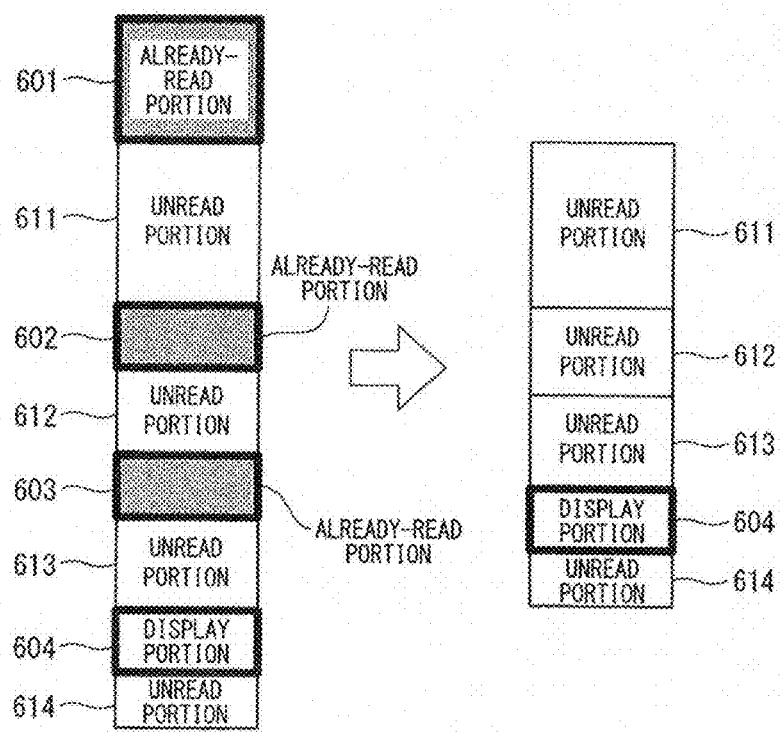
FIG. 13 illustrates according to another embodiment a non-limiting example depicting a scroll operation.
Figure 14:
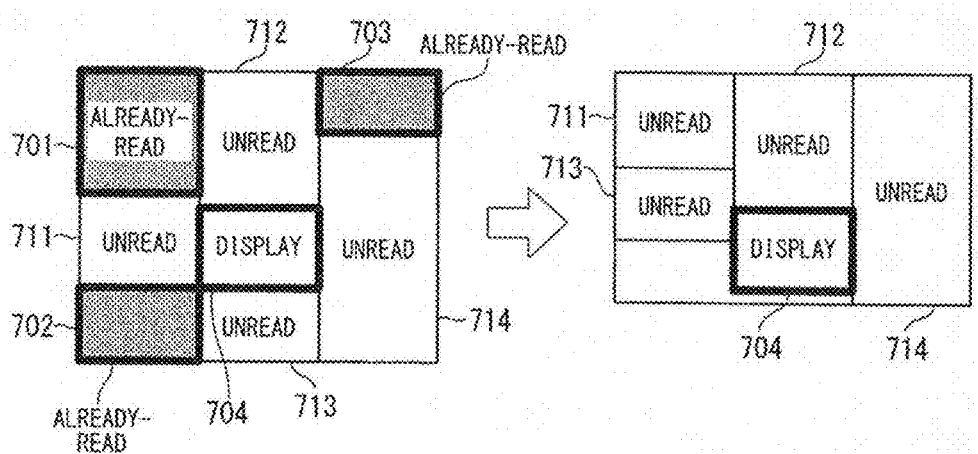
FIG. 14 depicts according to another example the display on the mobile device achieved by performing a scroll operation.

FIGS. 13 and 14 illustrate according to another embodiment, non-limiting examples depicting the data portions that are displayed on a mobile device. In the present embodiment, the mobile device for instance, operating in another mode, is configured to display only the unread portions of data when the user performs a scroll operation.

In FIG. 13, the diagram on the left hand side depicts longitudinally long data portions that include already-read and unread portions of data by the user. For instance, data portions 601, 602, 603, and 604 are already-read data portions by the user. Data portion 604 corresponds to the data portion that is currently being displayed on the mobile device. When the user performs a swipe operation, only the unread portions of data and the portion of data that was being viewed just prior to the scroll operation are configured to be displayed on the mobile device. For instance, referring to FIG. 13, upon performing the scroll operation only the unread data portions 611, 612, 613, 614 along with the data portion 604 that was displayed on the mobile device prior to the swipe operation are configured to be displayed thereafter.

Thus, the above feature provides the advantageous ability of presenting only the unread portions of data to the user, thereby providing the user quick and easy access to the unread portions of data. This feature also enables the user to save time in accessing the unread portions of data.

FIG. 14 depicts a scenario wherein the data to be displayed on the mobile device can be accessed by performing a scroll operation in the horizontal and vertical directions. The diagram on the left hand side of FIG. 14 depicts already portions of data 701, 702, 703, and 704 (portion of data that is currently being displayed on the mobile device) and unread portions of data 711, 712, 713, and 714. In the alternate mode of operation of the mobile device, when the user implements a scroll operation, only data portions 711, 712, 713 and 714 are configured to be displayed. Specifically, the mobile device continues to display the data portion 704 that was being displayed prior to the scroll operation being implemented. A further scroll operation provisions for only the unread portions of data to be displayed on the mobile device. Such an application of the mobile device is useful for instance when the user is reading news articles in a newspaper. The unread portions of data may correspond to the articles of the newspaper that the user has not yet read. Thus, the above feature provides a convenient mechanism of presenting only the unread articles to the user, thereby saving the user browsing time in searching for a particular unread news article.

In the embodiments of FIGS. 13 and 14, a normal mode and the alternative mode of operation of the mobile device may be chosen by making an appropriate selection by performing a touch operation or the like by the user. Furthermore, the embodiments described above are in no means limiting the user to operate in a certain mode for a specific amount of time. The user has the flexibility of changing the mode of operation of the device at his/her will.

Figure 15:
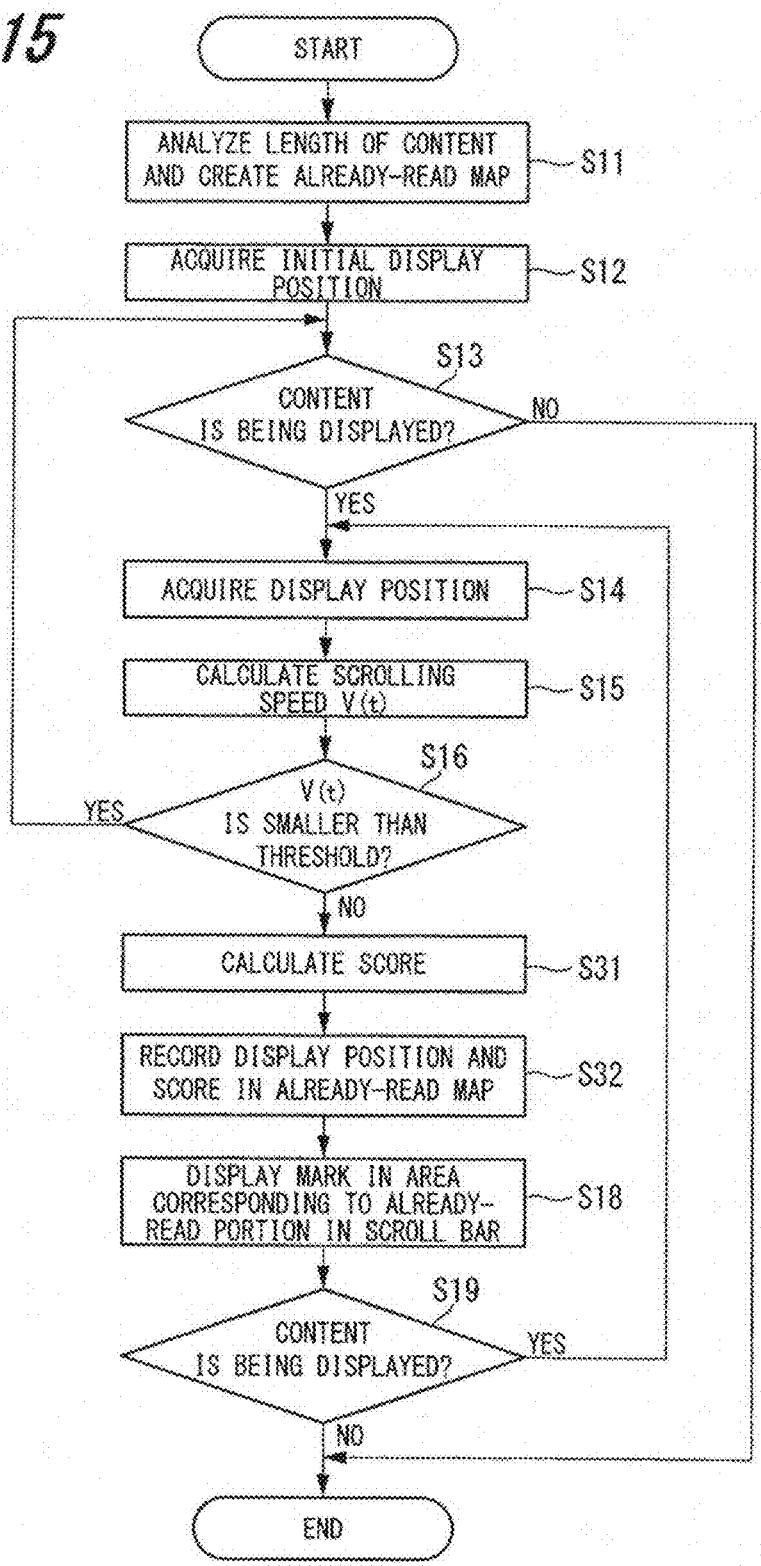
FIG. 15 illustrates a flowchart depicting the steps performed to identify portions of already-read data and assign a score to each already-read data portion.

FIG. 15 illustrates a flowchart depicting the steps performed to identify the already-read data portions by the user and further assign a score to each identified already-read data portion. The steps in the flowchart of FIG. 15 that are directed towards the identification of the already-read data portions are similar to the steps described in FIG. 6. Specifically steps S11-S16, S18, and S19 are identical to the corresponding steps in FIG. 6. Thus, a description of these steps is not repeated herein.

With reference to FIG. 15, steps S31 and S32 pertain to assigning a unique score to each identified already-read data portion and to save the data portion along with its assigned score in the already-read map. In step S31, the processor of the mobile device computes a score that is to be assigned to each data portion that has been identified as an already-read data portion.

According to one embodiment, if a certain data portion is configured to display data based on a user's tap or a touch operation, then the corresponding data portion may be assigned a score of four points. Further, if an already-read data portion includes a link to a website, then the already-read data portion may be assigned a score of three points. Similarly, if the data portion includes an action button, wherein the user can perform a certain action, the corresponding data portion may be assigned a score of two points. Accordingly, the data portions along with their assigned scores are stored in the already-read map. While displaying the already-read portions, the processor may be configured to display only those data portions whose assigned score is higher than a certain predetermined threshold.

It must be appreciated that the mechanism of assigning a score is not limited to the techniques described above. Alternate mechanisms may be implemented to assign a score to the already-read data portions. Thus, the present embodiment provides a means for assigning scores to the already-read data portions in a manner such that only the important data portions (based on the application at hand) are configured to be displayed in the mobile device.

Figure 16:
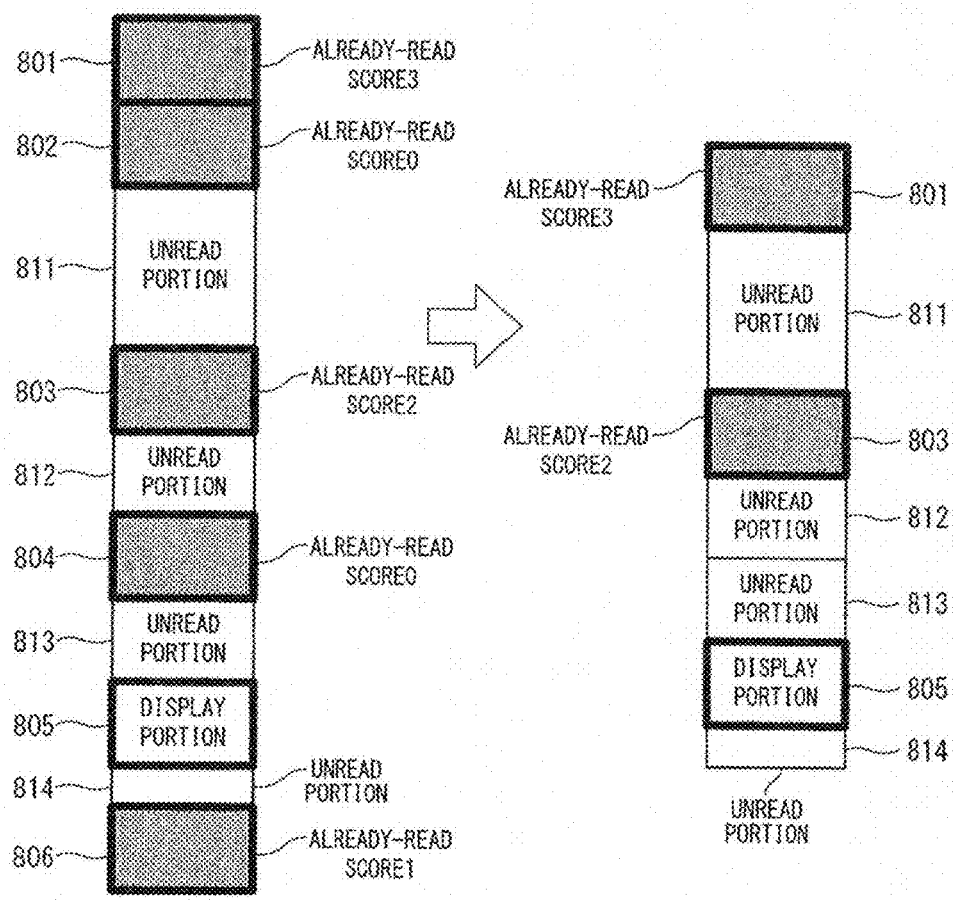
FIG. 16 depicts an exemplary example depicting the scoring and displaying of the already-read data portions.

FIG. 16 depicts an exemplary example depicting the scoring and displaying of the already-read data portions. In FIG. 16, the diagram on the left hand side depicts a plurality of data portions that include already-read data portions 801, 802, 803, 804, 805, and 806 and unread data portions 811, 812, 813, and 814. The data portion 805 is the data portion that is currently being displayed on the mobile device. Based on certain criteria (as described with reference to FIG. 15), the already-read data portions are assigned a score: data portion 801 is assigned a score of 3 points, portion 802 is assigned a score of 0 points, data portion 803 is assigned a score of 2 points, data portion 804 is assigned a score of 0 points, and data portion 806 is assigned a score of 1 point.

In the present embodiment, the mobile device is configured such that when the user performs a scroll/swipe operation on the touch panel of the mobile device, only the unread data portions as well the read data portions that have a score higher than a predetermined threshold will be displayed on the mobile device, as shown in the diagram on the right hand side of FIG. 16. Thus, the user can select important data portions (data portions with a score higher than the threshold) in a convenient and easy manner. For instance, in FIG. 16 only the already-read data portions whose score is higher than 2 points are configured to be displayed along with the unread data portions. Only data portions 801 and 803 of the already-read data portions are selected to be displayed on the mobile device along with the unread data portions 811-814.

According to another embodiment, the already-read data portions that have a score higher than a predetermined threshold score may be further differentiated based on a color scheme. For instance, important data portions which have the highest score assigned to them, are presumed to be frequently visited by the user and may be assigned a green color. The next set of data portions that have a second highest score may be assigned a red color and so on. Furthermore, a visual indication denoting the location of the important data portions within the scrollbar may be based on different criteria such as the color, shape, score assigned to the data portion or the like.

Obviously, numerous modifications and variations of the present invention are possible in light of the above teachings. It is therefore to be understood that within the scope of the appended claims, the invention may be practiced otherwise than as specifically described herein. For instance, the features described herein are equally applicable to a the scenario wherein the user performs a scrolling operation by touching an arrow key displayed on the display screen instead of performing a swiping action to achieve a scrolling of the data portions that are displayed on the screen. Additionally, devices other than the mobile phone terminal device 100 as shown in FIG. 2 may be used to perform the features discussed in present disclosure. For example, aspects of the present disclosure may be executed on a smart phone, a tablet, a general purpose computer, a laptop, an electronic reading device, or other such display terminals. Furthermore, software that performs the functions described herein may be stored in a memory disk, hard disk or the like and executed on the respective mobile devices.

It should be noted that, as used in the specification and the appended claims, the singular forms "a," "an," and "the" include plural referents unless the context clearly dictates otherwise.

The above disclosure also encompasses the embodiments noted below.

(1) An information processing apparatus comprising: circuitry configured to display a data portion of a plurality of data portions, determine whether each data portion is one of an already-viewed data portion and an unviewed data portion based on a speed of a scrolling operation performed while displaying the data portion, and generate and display an indicator corresponding to each data portion determined as the already-viewed data portion, a location of the indicator corresponding to the location of the already-viewed data portion within the plurality of data portions.

(2) The information processing apparatus of (1), wherein the circuitry determines that the data portion is an already-viewed data portion when the speed of the scrolling operation performed while displaying the data portion is lower than a predetermined threshold speed.

(3) The information processing apparatus of (1), wherein the circuitry determines that the data portion is an already-viewed data portion, if the data portion is displayed for an amount of time exceeding a predetermined threshold time.

(4) The information processing apparatus of (1), wherein the scrolling operation is performed in a vertical direction, the speed of the scrolling operation V(t), is computed as:

$V(t)=|\Delta x|/\Delta t,$ wherein $\Delta x$ is a displacement in the vertical direction and $\Delta t$ is a time required to perform the displacement.

(5) The information processing apparatus of (1), wherein the scrolling operation is performed in a vertical direction and a horizontal direction, the speed of the scrolling operation V(t), is computed as: $V(t)=\Delta d/\Delta t$, wherein $\Delta d$ is a net displacement computed as $\Delta d=\sqrt{(\Delta x)^2+(\Delta y)^2}$, $\Delta x$ is a displacement in the horizontal direction, $\Delta y$ is a displacement in the vertical direction, and $\Delta t$ is a time required to perform the net displacement.

(6) The information processing apparatus of (1), wherein the circuitry is further configured to compute a score for each of the data portions determined as the already-viewed data portion.

(7) The information processing apparatus of (6), wherein the circuitry is further configured to display only the indicators corresponding to the already-viewed data portions whose score is higher than a predetermined threshold score.

(8) The information processing apparatus of (7), wherein the circuitry is further configured to assign a color of a plurality of colors to the already-viewed data portions, each color of the plurality of colors indicating a level of importance of the already-viewed data portion.

(9) The information processing apparatus of (8), wherein the circuitry is further configured to display at least one of the score and color for each already-viewed data portion.

(10) The information processing apparatus of (1), wherein the circuitry is further configured to: detect a flick operation having a speed greater than the scroll operation; and display a first unviewed data portion upon detecting the flick operation.

(11) The information processing apparatus of (10), wherein the circuitry is further configured to generate and display a blank space for each data portion determined as the unviewed data portion, a location of the blank space corresponding to the location of the unviewed data portion within the plurality of data portions.

(12) The information processing apparatus of (11), wherein the circuitry is further configured to display only the unviewed data portions.

(13) An information processing method performed by an information processing apparatus, the method comprising: displaying, on a display panel, a data portion of a plurality of data portions; determining, by circuitry, whether each data portion is one of an already-viewed data portion and an unviewed data portion based on a speed of a scrolling operation performed while displaying the data portion; and generating and displaying an indicator corresponding to each data portion determined as the already-viewed data portion, a location of the indicator corresponding to the location of the already-viewed data portion within the plurality of data portions.

(14) The information processing method of (13), wherein the circuitry determines that the data portion is an already-viewed data portion when the speed of the scrolling operation performed while displaying the data portion is lower than a predetermined threshold speed.

(15) The information processing method of (13), wherein the circuitry determines that the data portion is an already-viewed data portion, if the data portion is displayed for an amount of time exceeding a predetermined threshold time.

(16) The information processing method of (13), further comprising: computing a score for each of the data portions determined as the already-viewed data portion; and generating and displaying, only the indicators corresponding to the already-viewed data portions whose score is higher than a predetermined threshold score.

(17) The information processing method of (16), further comprising: assigning, a color of a plurality of colors to the already-viewed data portions, each color of the plurality of colors indicating a level of importance of the already-viewed data portion.

(18) The information processing method of (13), further comprising: detecting a flick operation having a speed greater than the scroll operation; and displaying a first unviewed data portion based on the detecting.

(19) The information processing method of (13), further comprising: generating and displaying, a blank space for each data portion determined as the unviewed data portion, a location of the blank space corresponding to the location of the unviewed data portion within the plurality of data portions.

(20) A non-transitory computer-readable medium including computer program instructions, which when executed by an information processing apparatus, cause the information processing apparatus to perform a process, the process comprising: displaying, on a display panel, a data portion of a plurality of data portions; determining, by circuitry, whether each data portion is one of an already-viewed data portion and an unviewed data portion based on a speed of a scrolling operation performed while displaying the data portion; and generating and displaying an indicator corresponding to each data portion determined as the already-viewed data portion, a location of the indicator corresponding to the location of the already-viewed data portion within the plurality of data portions.

The invention claimed is:

1. An information processing apparatus comprising: circuitry configured to
    display, in a first area of a display panel, a data portion of a plurality of data portions,
    display a scrollbar in a second area of the display panel that is separate from the first area of the display panel, wherein the scrollbar provides an indicator as to a position of a data portion that is currently displayed in the first area of the display panel within an entire content of the data portion,
    determine whether each data portion of the plurality of data portions is one of an already-viewed data portion and an unviewed data portion based on a speed of a scrolling operation performed in a corresponding data portion while displaying the corresponding data portion,
    determine that the corresponding data portion is an already-viewed data portion when the speed of the scrolling operation performed in the corresponding data portion while displaying the corresponding data portion is lower than a predetermined threshold speed, and
    generate and display an area with a color scheme in the scrollbar corresponding to each data portion determined as the already-viewed data portion, a location of the area with the color scheme corresponding to the location of the already-viewed data portion within the plurality of data portions, wherein
    when the locations of the already-viewed data portions are discontinuous within the plurality of data portions, the locations of the area with the color scheme are correspondingly discontinuous and are interleaved with locations of blank spaces corresponding to the unviewed data portions and the indicators within the scrollbar.

2. The information processing apparatus of claim 1, wherein the circuitry determines that the corresponding data portion is an already-viewed data portion, if the corresponding data portion is displayed for an amount of time exceeding a predetermined threshold time.

3. The information processing apparatus of claim 1, wherein the scrolling operation is performed in a vertical direction, the speed of the scrolling operation $V(t)$, is computed as:

$$V(t)=|\Delta x|/\Delta t,$$

wherein $\Delta x$ is a displacement in the vertical direction and $\Delta t$ is a time required to perform the displacement.

4. The information processing apparatus of claim 1, wherein the scrolling operation is performed in a vertical direction and a horizontal direction, the speed of the scrolling operation $V(t)$, is computed as:

$$V(t)=\Delta d/\Delta t,$$

wherein $\Delta d$ is a net displacement computed as $\Delta d=\sqrt{(\Delta x)^2+(\Delta y)^2}$, $\Delta x$ is a displacement in the horizontal direction, Δy is a displacement in the vertical direction, and Δt is a time required to perform the net displacement.

5. The information processing apparatus of claim 1, wherein the circuitry is further configured to compute a score for each of the data portions determined as the already-viewed data portion.

6. The information processing apparatus of claim 5, wherein the circuitry is further configured to display only the area with the color scheme corresponding to the already-viewed data portions whose score is higher than a predetermined threshold score.

7. The information processing apparatus of claim 6, wherein the circuitry is further configured to assign a color of a plurality of colors to the already-viewed data portions, each color of the plurality of colors indicating a level of importance of the already-viewed data portion.

8. The information processing apparatus of claim 7, wherein the circuitry is further configured to display at least one of the score and color for each already-viewed data portion.

9. The information processing apparatus of claim 1, wherein the circuitry is further configured to
detect a flick operation having a speed greater than the scroll operation; and
display a first unviewed data portion upon detecting the flick operation.

10. The information processing apparatus of claim 1, wherein the locations of the blank spaces correspond to locations of the unviewed data portions within the plurality of data portions.

11. An information processing method performed by an information processing apparatus, the method comprising:
displaying, in a first area of a display panel, a data portion of a plurality of data portions;
displaying a scrollbar in a second area of the display panel that is separate from the first area of the display panel, wherein the scrollbar provides an indicator as to a position of a data portion that is currently displayed in the first area of the display panel within an entire content of the data portion;
determining, by circuitry, whether each data portion of the plurality of data portions is one of an already-viewed data portion and an unviewed data portion based on a speed of a scrolling operation performed in a corresponding data portion while displaying the corresponding data portion;
determining, by the circuitry, that the corresponding data portion is an already-viewed data portion when the speed of the scrolling operation performed in the corresponding data portion while displaying the corresponding data portion is lower than a predetermined threshold speed; and
generating and displaying an area with a color scheme in the scrollbar corresponding to each data portion determined as the already-viewed data portion, a location of the area with the color scheme corresponding to the location of the already-viewed data portion within the plurality of data portions, wherein
when the locations of the already-viewed data portions are discontinuous within the plurality of data portions, the locations of the area with the color scheme are correspondingly discontinuous and are interleaved with locations of blank spaces corresponding to the unviewed data portions and the indicators within the scrollbar.

12. The information processing method of claim 11, wherein the circuitry determines that the corresponding data portion is an already-viewed data portion, if the corresponding data portion is displayed for an amount of time exceeding a predetermined threshold time.

13. The information processing method of claim 11, further comprising:
computing a score for each of the data portions determined as the already-viewed data portion; and
generating and displaying, only the area with the color scheme corresponding to the already-viewed data portions whose score is higher than a predetermined threshold score.

14. The information processing method of claim 13, further comprising:
assigning, a color of a plurality of colors to the already-viewed data portions, each color of the plurality of colors indicating a level of importance of the already-viewed data portion.

15. The information processing method of claim 11, further comprising:
detecting a flick operation having a speed greater than the scroll operation; and
displaying a first unviewed data portion based on the detecting.

16. The information processing method of claim 11, wherein
the locations of the blank spaces correspond to locations of the unviewed data portions within the plurality of data portions.

17. A non-transitory computer-readable medium including computer program instructions, which when executed by an information processing apparatus, cause the information processing apparatus to perform a process, the process comprising:
displaying, in a first area of a display panel, a data portion of a plurality of data portions;
displaying a scrollbar in a second area of the display panel that is separate from the first area of the display panel, wherein the scrollbar provides an indicator as to a position of a data portion that is currently displayed in the first area of the display panel within an entire content of the data portion;
determining, by circuitry, whether each data portion of the plurality of data portions is one of an already-viewed data portion and an unviewed data portion based on a speed of a scrolling operation performed in a corresponding data portion while displaying the corresponding data portion;
determining that the corresponding data portion is an already-viewed data portion when the speed of the scrolling operation performed in the corresponding data portion while displaying the corresponding data portion is lower than a predetermined threshold speed; and
generating and displaying an area with a color scheme in the scrollbar corresponding to each data portion determined as the already-viewed data portion, a location of the area with the color scheme corresponding to the location of the already-viewed data portion within the plurality of data portions, wherein
when the locations of the already-viewed data portions are discontinuous within the plurality of data portions, the locations of the area with the color scheme are correspondingly discontinuous and are interleaved with locations of blank spaces corresponding to the unviewed data portions and the indicators within the scrollbar.

\* \* \* \* \*